United States Patent

Fujii et al.

[11] Patent Number: 5,358,773
[45] Date of Patent: Oct. 25, 1994

[54] ADHESIVE STRUCTURE

[75] Inventors: Minoru Fujii; Etsuro Nishio, both of Tokyo, Japan

[73] Assignee: Asahi Kogaku Kogyo Kabushiki Kaisha, Tokyo, Japan

[21] Appl. No.: 939,156

[22] Filed: Sep. 2, 1992

[30] Foreign Application Priority Data

Sep. 13, 1991 [JP] Japan .............. 3-081893[U]

[51] Int. Cl.⁵ ................................. B32B 3/28
[52] U.S. Cl. .................... 428/167; 428/119; 428/120; 428/172; 428/192
[58] Field of Search .......... 428/156, 172, 167, 119, 428/120, 188, 192, 212, 343

[56] References Cited

U.S. PATENT DOCUMENTS 5,087,504  2/1992  Kanai et al. ................. 428/167

*Primary Examiner*—Donald J. Loney
*Attorney, Agent, or Firm*—Sandler Greenblum & Bernstein

[57] ABSTRACT

A structure having a surface to which an adhesive, fed from a movable nozzle, is applied before connecting an object to the surface. The structure includes a guide groove provided on the surface in which the adhesive is to be applied, such that the nozzle may be moved along the guide groove to introduce the adhesive into the groove.

15 Claims, 4 Drawing Sheets

ADHESIVE STRUCTURE

BACKGROUND OF THE INVENTION

1. Field of the Invention

The present invention relates to a connecting apparatus using an adhesive. More precisely, the invention relates to an improved surface structure which is to be coated with an adhesive.

2. Description of Related Art

In a known connecting mechanism which uses an adhesive, an appropriate quantity of adhesive is fed from a nozzle which is manually moved to coat a surface with the adhesive. If an excessive amount of adhesive is fed from the nozzle, upon adhering an object to the surface on which the adhesive is applied, the excess adhesive may exude from between the adhered surfaces onto surrounding surfaces or elements, resulting in an undesirable appearance or a deterioration of quality or function of the adhered objects. This problem becomes particularly serious when the elements to be adhered are small.

SUMMARY OF THE INVENTION

The primary object of the present invention is to provide a structure to which an adhesive can be easily applied, and which prevents excess adhesive from exuding from between the structure and an adhered surface.

To achieve the object, according to the present invention, there is provided a structure on which an adhesive, fed from a movable nozzle, is applied before connecting an object thereto. A guide groove is provided on the surface to which the adhesive is to be applied so that the nozzle may be guided along the groove to apply adhesive to the surface in a desired manner.

According to another aspect of the present invention, a structure comprises a base member having an adhesive applying surface to which an adhesive is to be applied, an object to be adhered to the surface of the base member to which the adhesive is applied, and a guide groove provided on at least one of the connecting surfaces of the base member or the object to be adhered with the adhesive.

With this arrangement, since the front end of the nozzle, from which the adhesive is fed, is moved along the guide groove relative to the surface, the adhesive can be properly applied to the adhesive applying surface. This increases the operational efficiency of the adhesive application process.

Preferably, an adhesive discharging groove is provided on the side of the guide groove, so that if excess adhesive is applied to the surface, the adhesive exuded therefrom will overflow into the adhesive discharging groove.

Consequently, adhesive is prevented from undesirably coming into contact with surfaces or elements adjacent to the connecting surfaces of the base member, or the object to be adhered.

According to still another aspect of the present invention, there is provided a connecting apparatus for connecting opposed surfaces of two members, to which an adhesive has been applied, comprising a guide groove formed on at least one of the connecting surfaces, so that a predetermined amount of adhesive can be introduced into the guide groove.

The present disclosure relates to subject matter contained in Japanese utility model application No. 3-81893 (filed on Sep. 13, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
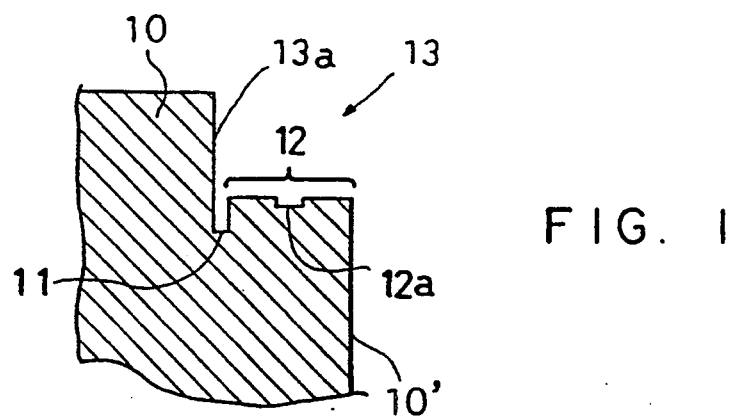
FIG. 1 is a sectional view of a base member according to the present invention.

FIGS. 1 through 4 show a first embodiment of the present invention, in which a base member 10 is provided with a recess 13, in which an object 23 is to be adhered. The bottom of recess 13 is a surface 12, which is shaped for adhesion. Surface 12 is provided with a guide groove 12a. An adhesive discharging groove 11 is provided parallel to the guide groove 12a. The adhesive discharging groove 11 is substantially defined by a vertical wall 13a, which forms the recess 13 together with the surface 12, as shown in FIG. 1.

Figure 2:
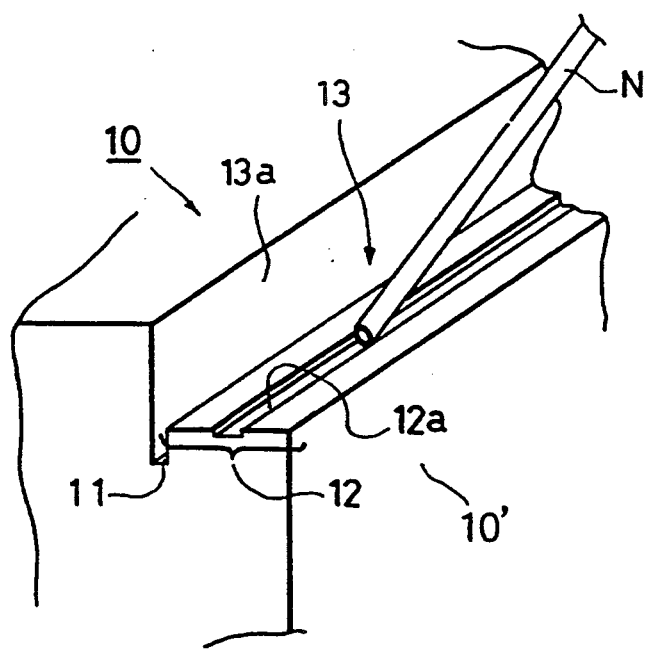
FIG. 2 is a perspective view of a base member and nozzle from which an adhesive is fed.

The adhesive is fed from the front end of a nozzle N, which is moved along the guide groove 12a, to coat the surface 12, as shown in FIG. 2.

Figure 3:
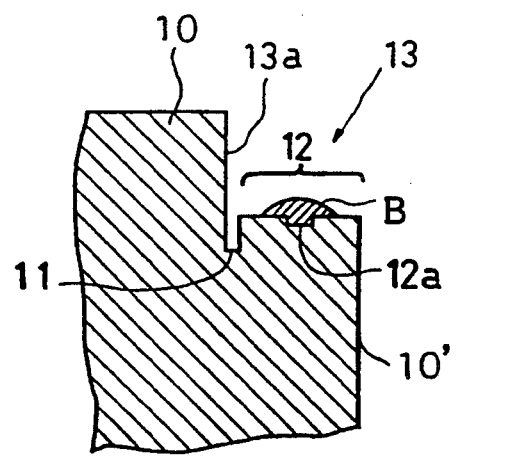
FIG. 3 is a sectional view of a base member which is coated with an adhesive, according to the present invention.

FIG. 3 shows the adhesive B applied to the adhesive surface 12 of the base member 10 in the guide groove 12a.

Figure 4:
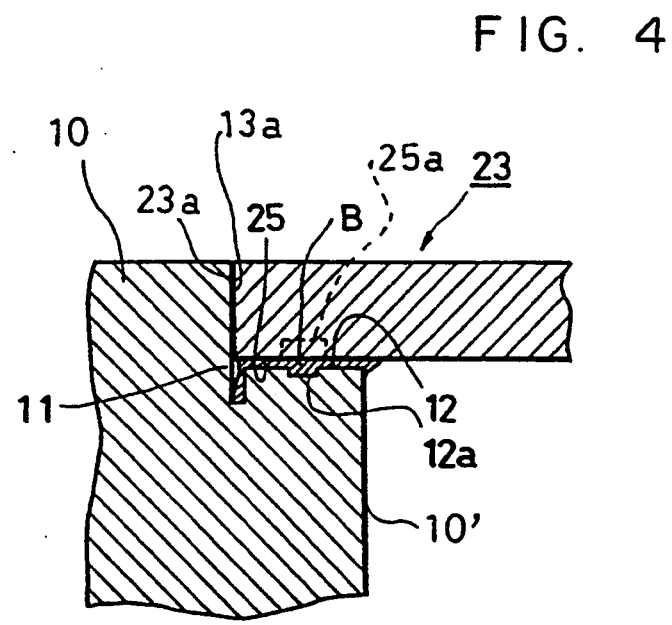
FIG. 4 is a sectional view of a base member and an object adhered thereto, according to the present invention.

Object 23 is adhered to the surface 12 by adhesive B applied along the guide groove 12a, as shown in FIG. 4. Since the adhesive B is applied only to an area limited by the guide groove of surface 12 (i.e., an area including the groove 12a and the vicinity thereof, as opposed to an irregular area which would be covered if the adhesive were to be applied without the aid of a groove), the amount of adhesive B, fed into the guide groove 12a from the nozzle N, is such that little or no adhesive exudes beyond the surface 12a when the object is attached.

If a small amount of adhesive B were to exude beyond the surface 12a, the excess adhesive B would be effectively introduced into the discharging groove 11, preventing an excess of adhesive B from coming into contact with the upper surfaces of the base member 10 or the object 23. Specifically, as the adhesive discharging groove 11 is formed at the bottom of the recess 13 between the vertical wall 13a and the surface 12a, adhesive B does not enter the area between the vertical wall 13a and the end face 23a of the adhered object 23.

Figure 6:
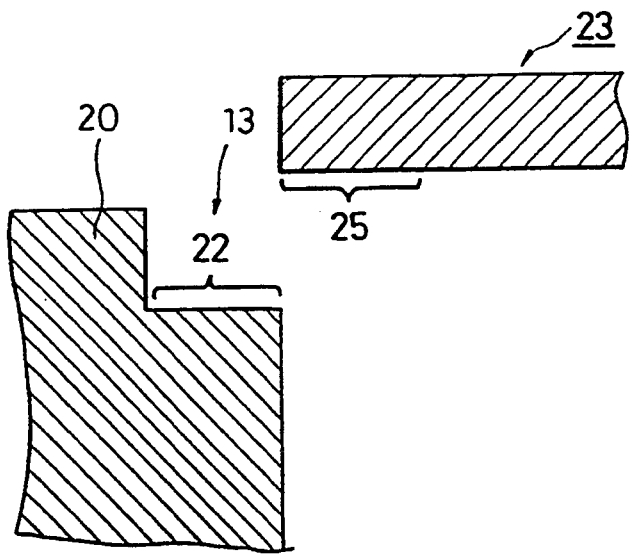
FIG. 6 is a sectional view of a known base member and an object to be adhered thereto.
Figure 7:
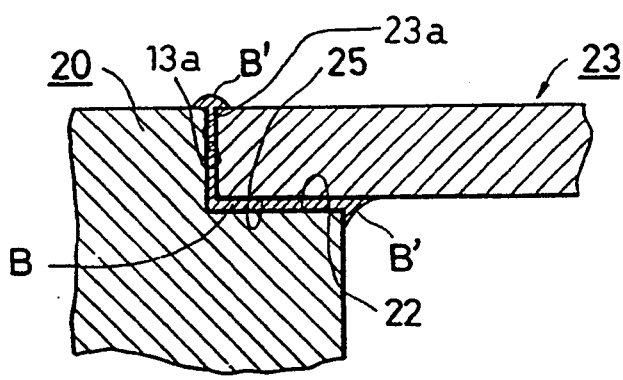
FIG. 7 is a sectional view of a known base member shown in FIG. 6 and an object adhered to the base member; and, FIG. 8 is a schematic perspective view of a known base member having a surface on which an adhesive is applied.
Figure 8:
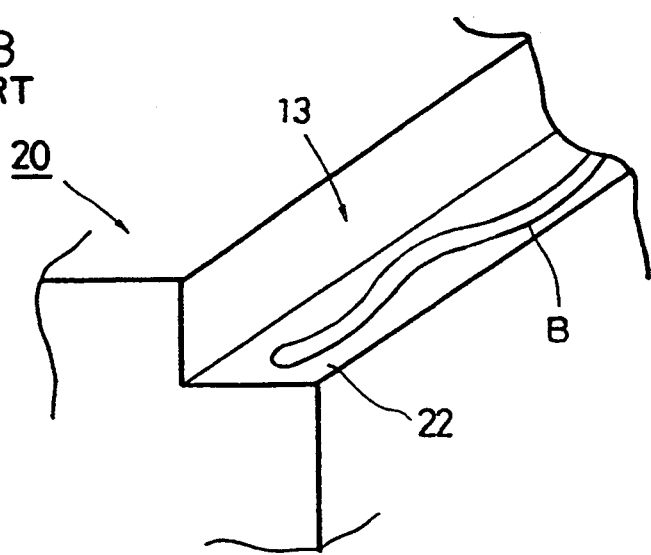

FIGS. 6 through 8 show prior art, in which neither a guide groove (such as a guide groove 12a in the present invention), nor an adhesive discharging groove (such as adhesive discharging groove 11 in the present invention) are provided. In an arrangement shown in FIG. 6, a base member 20 has a recess 13 in which the object 23 is to be adhered. Unlike the present invention, the recess 13 shown in FIG. 6 is defined by a flat bottom surface 22 (i.e., a flat surface, without a guide groove as shown in FIGS. 1 through 4, to which an adhesive is to be applied).

In a known structure as shown in FIG. 6, if there is an excess of adhesive B applied to the flat surface 22, or if the adhesive B is irregularly applied to the flat surface 22, as shown in FIG. 8, the adhesive B is forced out from between the adhesive surfaces 22 and 25 of the base member 20 and the object 23 when the surfaces are attached, as shown at "B'" in FIG. 7. In such case, the excess adhesive B' may undesirably come into contact with an adjacent element (not shown). In particular, the adhesive B', flowing up through the clearance between the vertical wall surface 13a of the recess 13 and the end surface 23a of the object 23 to be adhered, appears on the upper surfaces of the base member 20 and the object 23. The excess adhesive B' must then be wiped away or scraped off. Not only is this troublesome, but it often results in a deterioration of quality or performance of a device employing the connecting structure, or, in some cases, a poor appearance of the device.

Although the surface 12, of the base member 10, is defined by the bottom surface of the recess 13, and the object 23 to be adhered, is shaped in such a manner that it may be received in the recess 13, the shapes of the recess 13 and the associated object 23 are not limited to those in the illustrated embodiment. For example, the base member 10 may form a part of a camera body, and the object 23 to be adhered may be a cover which closes an opening 10' of a camera body 10.

Figure 5A:
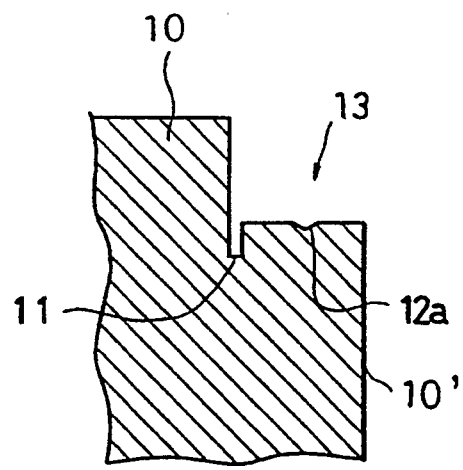
FIG. 5A and 5B are sectional views of a base member according to different embodiments of the present invention.
Figure 5B:
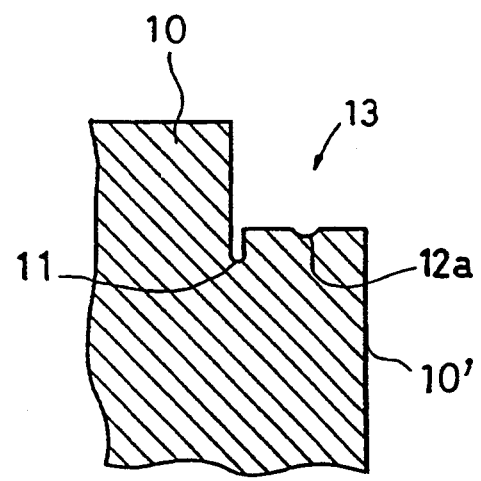

The guide groove 12a provided on the surface 12 can be of V-shape or U-shape, as shown in FIGS. 5A and 5B, respectively. Similarly, the shape of the adhesive discharging groove 11 is not limited to that in the illustrated embodiment.

It is possible to provide a guide groove 25a (FIG. 4) similar to the guide groove 12a on the surface 25 of the object 23 to be adhered, so that the adhesive B is fed from the nozzle N, which is moved along the guide groove 25a.

As can be seen from the above discussion, according to the present invention, since the guide groove, along which the adhesive supplying nozzle is moved, is provided on the adhesive applying surface, the adhesive can be regularly fed from the nozzle within a limited space, including the guide groove and the vicinity thereof. This increases the operational efficiency of the adhesive application process.

Furthermore, since an adhesive discharging groove is provided at the side of the surface, even if a larger than optimum amount of adhesive is fed from an adhesive applying nozzle, the excess adhesive exuded from the surface will be effectively discharged into the adhesive discharging groove. Accordingly, excess adhesive will not undesirably come into contact with a surface or element other than the intended surface.

We claim:

1. A structure comprising:
   a recess having a first surface to which an adhesive is applied;
   a second surface which is substantially perpendicular to said first surface; and
   a guide groove provided on said first surface in order to introduce the adhesive into said guide groove and onto said first surface.

2. A structure according to claim 1, further comprising an adhesive discharging groove; wherein said adhesive discharging groove is located where said first and second surfaces would intersect in the absence of said adhesive discharging groove.

3. A structure according to claim 2, wherein said adhesive discharging groove is parallel to said guide groove.

4. A structure according to claim 3, further comprising a base member in which said recess is formed; and an object to be adhered to said first surface.

5. A structure according to claim 2, wherein said adhesive discharging groove comprises means for preventing an excess of adhesive from coming into contact with said object in areas other than a connecting surface of said object which is to be adhered to said first surface.

6. A structure according to claim 2, wherein said adhesive discharging groove comprises two substantially opposing sides, wherein one of said two substantially opposing sides extends from said second surface, and the other of said two substantially opposing sides comprises a third surface which joins said first surface.

7. A structure comprising:
   a base member having a first surface to which an adhesive is to be applied, and a second surface which is substantially perpendicular to said first surface;
   an object to be adhered to at least said first surface of said base member;
   a guide groove provided on at least one of connecting surfaces of said base member and said object to be adhered by the adhesive applied therebetween; and
   an adhesive discharging groove provided in said first surface in conjunction with said second surface.

8. A structure according to claim 7, wherein said adhesive discharging groove comprises means for preventing an excess of adhesive from coming into contact with said object in areas other than said connecting surface.

9. A structure according to claim 7, wherein said adhesive discharging groove comprises two substantially opposing sides, wherein one of said two substantially opposing sides extends from said second surface, and the other of said two substantially opposing sides comprises a third surface which joins said first surface.

10. A structure according to claim 7, wherein said adhesive discharging groove is located where said first and second surfaces would intersect in the absence of said adhesive discharging groove.

11. A connecting apparatus for connecting opposed connecting surfaces of two members by an adhesive applied to one of said connecting surfaces, comprising:
    a guide groove formed on at least one of said connecting surfaces, so that a predetermined amount of adhesive can be introduced in said guide groove; and
    wherein one of the members further comprises a surface which is substantially perpendicular to said connecting surface of said one of the members; and
    an adhesive discharging groove provided in said connecting surface of said member which comprises said substantially perpendicular surface, in conjunction with said substantially perpendicular surface.

12. A connecting apparatus according to claim 11, wherein said adhesive discharging groove is adjacent to said guide groove.

13. A connecting apparatus according to claim 11, wherein said adhesive discharging groove comprises means for preventing an excess of adhesive from coming into contact with areas other than said connecting surfaces.

14. A connecting apparatus according to claim 11, wherein said adhesive discharging groove comprises two substantially opposing sides, wherein one of said two substantially opposing sides extends from said substantially perpendicular surface, and the other of two substantially opposing sides comprises a third surface which joins said connecting surface that is substantially perpendicular to said surface.

15. A connecting apparatus according to claim 11, wherein said adhesive discharging groove is located where said connecting surface of said member which comprises said substantially perpendicular surface and said substantially perpendicular surface would intersect in the absence of said adhesive discharging groove.

* * * * *